(12) United States Patent
Ahn et al.

(10) Patent No.: US 9,451,598 B2
(45) Date of Patent: Sep. 20, 2016

(54) METHOD AND APPARATUS FOR TRANSMITTING CHANNEL STATUS INFORMATION IN CARRIER AGGREGATION SYSTEM

(75) Inventors: Joon Kui Ahn, Anyang-si (KR); Suck Chel Yang, Anyang-si (KR); Min Gyu Kim, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 243 days.

(21) Appl. No.: 13/991,151

(22) PCT Filed: Dec. 1, 2011

(86) PCT No.: PCT/KR2011/009252
§ 371 (c)(1),
(2), (4) Date: May 31, 2013

(87) PCT Pub. No.: WO2012/074305
PCT Pub. Date: Jun. 7, 2012

(65) Prior Publication Data
US 2013/0250903 A1    Sep. 26, 2013

Related U.S. Application Data

(60) Provisional application No. 61/427,453, filed on Dec. 27, 2010, provisional application No. 61/418,871, filed on Dec. 2, 2010, provisional application No. 61/479,412, filed on Apr. 27, 2011.

(51) Int. Cl.
*H04L 1/00* (2006.01)
*H04W 72/04* (2009.01)
(Continued)

(52) U.S. Cl.
CPC ........ *H04W 72/0413* (2013.01); *H04L 1/0026* (2013.01); *H04L 1/0027* (2013.01);
(Continued)

(58) Field of Classification Search
None
See application file for complete search history.

(56) References Cited

U.S. PATENT DOCUMENTS

2009/0257356 A1* 10/2009 Frederiksen et al. ......... 370/252
2010/0098012 A1    4/2010 Bala et al.
(Continued)

FOREIGN PATENT DOCUMENTS

KR   10-2004-0072817    8/2004
KR   10-2006-0019153    3/2006
(Continued)

OTHER PUBLICATIONS

Korean Intellectual Property Office Application Serial No. 10-2013-7013512, Notice of Allowance dated Aug. 13, 2015, 2 pages.
(Continued)

*Primary Examiner* — Fan Ng
(74) *Attorney, Agent, or Firm* — Lee, Hong, Degerman, Kang & Walmey; Jonathan Kang; Michael Monaco

(57) ABSTRACT

Provided is a channel status information (CSI) transmission method performed by a user equipment in a carrier aggregation system. The method includes: allocating a plurality of serving cells; configuring a subframe predetermined to transmit CSI for a single serving cell among the allocated plurality of serving cells; and if uplink data transmission via a physical uplink shared channel (PUSCH) region exists in the configured subframe and if the single serving cell is deactivated, transmitting deactivation confirmation information for indicating that the single serving cell is deactivated via the PUSCH region together with the uplink data.

13 Claims, 15 Drawing Sheets

(51) Int. Cl.
*H04L 1/16* (2006.01)
*H04L 5/00* (2006.01)
*H04W 28/06* (2009.01)

(52) U.S. Cl.
CPC ........... *H04L1/1671* (2013.01); *H04L 5/0057* (2013.01); *H04L 5/0098* (2013.01); *H04L 5/001* (2013.01); *H04W 28/06* (2013.01)

(56) References Cited

U.S. PATENT DOCUMENTS

| | | | |
|---|---|---|---|
| 2010/0273514 A1* | 10/2010 | Koo | H04B 7/024 455/501 |
| 2010/0296389 A1 | 11/2010 | Khandekar et al. | |
| 2011/0019637 A1* | 1/2011 | Ojala et al. | 370/329 |
| 2011/0183702 A1* | 7/2011 | Weaver et al. | 455/522 |
| 2011/0255428 A1* | 10/2011 | Park et al. | 370/252 |
| 2011/0269490 A1* | 11/2011 | Earnshaw et al. | 455/509 |
| 2011/0310855 A1* | 12/2011 | Yin | H04L 1/0067 370/336 |
| 2012/0009923 A1* | 1/2012 | Chen et al. | 455/434 |
| 2012/0039280 A1* | 2/2012 | Chen et al. | 370/329 |
| 2012/0058797 A1* | 3/2012 | Gaal et al. | 455/522 |
| 2012/0120817 A1* | 5/2012 | Khoshnevis et al. | 370/252 |
| 2012/0176996 A1* | 7/2012 | Kim | H04W 72/0413 370/329 |
| 2013/0163527 A1* | 6/2013 | Lunttila et al. | 370/329 |

FOREIGN PATENT DOCUMENTS

| | | |
|---|---|---|
| KR | 10-2008-0031426 | 4/2008 |
| KR | 10-2009-0076784 | 7/2009 |
| KR | 10-2010-0100644 | 9/2010 |

OTHER PUBLICATIONS

Korean Intellectual Property Office Application Serial No. 10-2013-7013512, Office Action dated Feb. 3, 2015, 6 pages.

* cited by examiner

METHOD AND APPARATUS FOR TRANSMITTING CHANNEL STATUS INFORMATION IN CARRIER AGGREGATION SYSTEM

CROSS-REFERENCE TO RELATED APPLICATIONS

This application is the National Stage filing under 35 U.S.C. 371 of International Application No. PCT/KR2011/009252, filed on Dec. 1, 2011, which claims the benefit of U.S. Provisional Application Ser. Nos. 61/418,871, filed on Dec. 2, 2010, 61/427,453, filed on Dec. 27, 2010 and 61/479,412, filed on Apr. 27, 2011, the contents of which are all hereby incorporated by reference herein in their entirety.

TECHNICAL FIELD

The present invention relates to wireless communications, and more particularly, to a method and apparatus for transmitting channel status information of a user equipment in a carrier aggregation system supporting multiple-carrier aggregation.

BACKGROUND ART

In order to maximize efficiency of limited radio resources, an effective transmission and reception scheme and various methods of utilization thereof have been proposed in a broadband wireless communication system. A carrier aggregation system is one of systems considered in a next-generation wireless communication system. The carrier aggregation system implies a system which supports a broadband by aggregating one or more carriers having a bandwidth narrower than that of a desired broadband when a wireless communication system intends to support the broadband.

A wireless communication system such as conventional $3^{rd}$ generation partnership project (3GPP) long term evolution (LTE) uses a carrier of various bandwidths, but is a single-carrier system which uses one carrier. Meanwhile, a next-generation wireless communication system such as LTE-advanced (A) may be a multiple-carrier system which aggregates multiple carriers, that is, which uses carrier aggregation.

The single-carrier system (e.g., LTE) uses a single-carrier property to effectively use a power amplifier of a user equipment (UE) in an uplink in which the UE transmits a signal to a base station (BS). A control region for transmitting control information and a data region for transmitting data are distinctively used by the UE. To maintain a single-carrier property, signals are not simultaneously transmitted in the control region and the data region.

On the other hand, the carrier-aggregation system (e.g., LTE-A) may or may not allow simultaneous transmission of the control region and the data region according to a configuration. If the carrier aggregation system does not allow the simultaneous transmission of the control region and the data region, there may be a case where the UE must transmit channel status information together with data at a specific time. In this case, the UE may transmit the channel status information together with the data in the data region, which is expressed that the channel status information is transmitted in a piggyback (or multiplexing) manner. If the channel status information is piggybacked in the data region, the resource region on which data is intended to be carried is punctured, and thus the channel status information is transmitted by using the punctured region. Alternatively, rate matching is performed. That is, if the channel status information is piggybacked, the data of the data region is transmitted differently from a case where the channel status information is not piggybacked.

Piggyback transmission of the channel status information is performed only for an activated carrier, and is not performed for a deactivated carrier. However, an activation/deactivation state for a specific carrier may be incorrectly recognized between the BS and the UE. In this case, channel status information for a carrier unexpected by the BS may be transmitted in a piggyback manner. Therefore, a problem may arise in that the BS fails to properly decode the data included in the data region.

SUMMARY OF INVENTION

Technical Problem

The present invention provides a method and apparatus for transmitting channel status information in a carrier aggregation system.

Technical Solution

According to an aspect of the present invention, a channel status information (CSI) transmission method performed by a user equipment in a carrier aggregation system is provided. The method includes: allocating a plurality of serving cells; configuring a subframe predetermined to transmit CSI for a single serving cell among the allocated plurality of serving cells; and if uplink data transmission via a physical uplink shared channel (PUSCH) region exists in the configured subframe and if the single serving cell is deactivated, transmitting deactivation confirmation information for indicating that the single serving cell is deactivated via the PUSCH region together with the uplink data.

In the aforementioned aspect of the present invention, the deactivation confirmation information may be transmitted by using the same resource as that used for CSI transmitted when the single serving cell is activated in the PUSCH region.

In addition, the deactivation confirmation information may be transmitted by puncturing the same resource or by performing the same rate-matching as that used for the CSI transmitted when the single serving cell is activated.

In addition, the single serving cell may include a single downlink component carrier, and the deactivation confirmation information may be information for indicating that the single downlink component carrier is deactivated.

In addition, the CSI for the single serving cell may be periodic CSI.

According to another aspect of the present invention, a CSI transmission method performed by a user equipment in a carrier aggregation system is provided. The method includes: allocating a plurality of serving cells; configuring a subframe predetermined to transmit CSI for N serving cells (where N is a natural number greater than or equal to 2) among the allocated plurality of serving cells; and selecting a single activated serving cell to which the CSI is fed back among the N serving cells, wherein if uplink data transmission via a PUSCH region exists in the configured subframe, the CSI for the single activated serving cell is transmitted using a PUSCH resource corresponding to a union of PUSCH resources for transmitting CSI for each of the N serving cells.

In the aforementioned aspect of the present invention, the N serving cells may include a deactivated serving cell.

In addition, the CSI for the activated single serving cell may be transmitted together with the uplink data.

In addition, the CSI for the activated single serving cell may be transmitted in some of the PUSCH resources corresponding to the union, and dummy data may be transmitted in the remaining PUSCH resources.

In addition, the activated single serving cell may include a single downlink component carrier, and the CSI for the activated single serving cell may be CSI for the single downlink component carrier.

According to another aspect of the present invention, a CSI transmission method performed by a user equipment in a carrier aggregation system is provided. The method includes: allocating a plurality of serving cells; configuring a subframe predetermined to transmit CSI for a single serving cell among the allocated plurality of serving cells; and selecting one serving cell for which the CSI is fed back among the at least one serving cell, wherein if the selected one serving cell is a deactivated serving cell, a specific value is transmitted among CSI that can be transmitted when the selected one serving cell is activated.

In the aforementioned aspect of the present invention, the specific value may be a value indicating a worst channel status.

According to another aspect of the present invention, there is provided a user equipment including: a radio frequency (RF) unit for transmitting and receiving a radio signal; and a processor coupled to the RF unit, wherein the processor allocates a plurality of serving cells, configures a subframe predetermined to transmit CSI for a single serving cell among the allocated plurality of serving cells, and if uplink data transmission via a PUSCH region exists in the configured subframe and if the single serving cell is deactivated, transmits deactivation confirmation information for indicating that the single serving cell is deactivated via the PUSCH region together with the uplink data.

According to another aspect of the present invention, there is provided a user equipment including: an RF unit for transmitting and receiving a radio signal; and a processor coupled to the RF unit, wherein the processor allocates a plurality of serving cells, assigns a subframe predetermined to transmit CSI for N serving cells (where N is a natural number greater than or equal to 2) among the allocated plurality of serving cells, and selects a single activated serving cell to which the CSI is fed back among the N serving cells, wherein if uplink data transmission via a PUSCH region exists in the configured subframe, the CSI for the single activated serving cell is transmitted using a PUSCH resource corresponding to a union of PUSCH resources for transmitting CSI for each of the N serving cells.

According to another aspect of the present invention, there is provided a user equipment including: an RF unit for transmitting and receiving a radio signal; and a processor coupled to the RF unit, wherein the processor allocates a plurality of serving cells, configures a subframe predetermined to transmit CSI for a single serving cell among the allocated plurality of serving cells, and selects one serving cell for which the CSI is fed back among the at least one serving cell, wherein if the selected one serving cell is a deactivated cell, a specific value is transmitted among CSI that can be transmitted when the selected one serving cell is activated.

Advantageous Effects

According to the present invention, even if an activation/deactivation state for a specific serving cell, i.e., a specific carrier, is erroneously recognized between a user equipment and a base station in a carrier aggregation system, the base station can correctly decode uplink data.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with an IEEE 802.16e-based system. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is evolved from the 3GPP LTE.

Although the following description focuses on LTE and LTE-A for clarity, the technical features of the present invention are not limited thereto.

Figure 1:
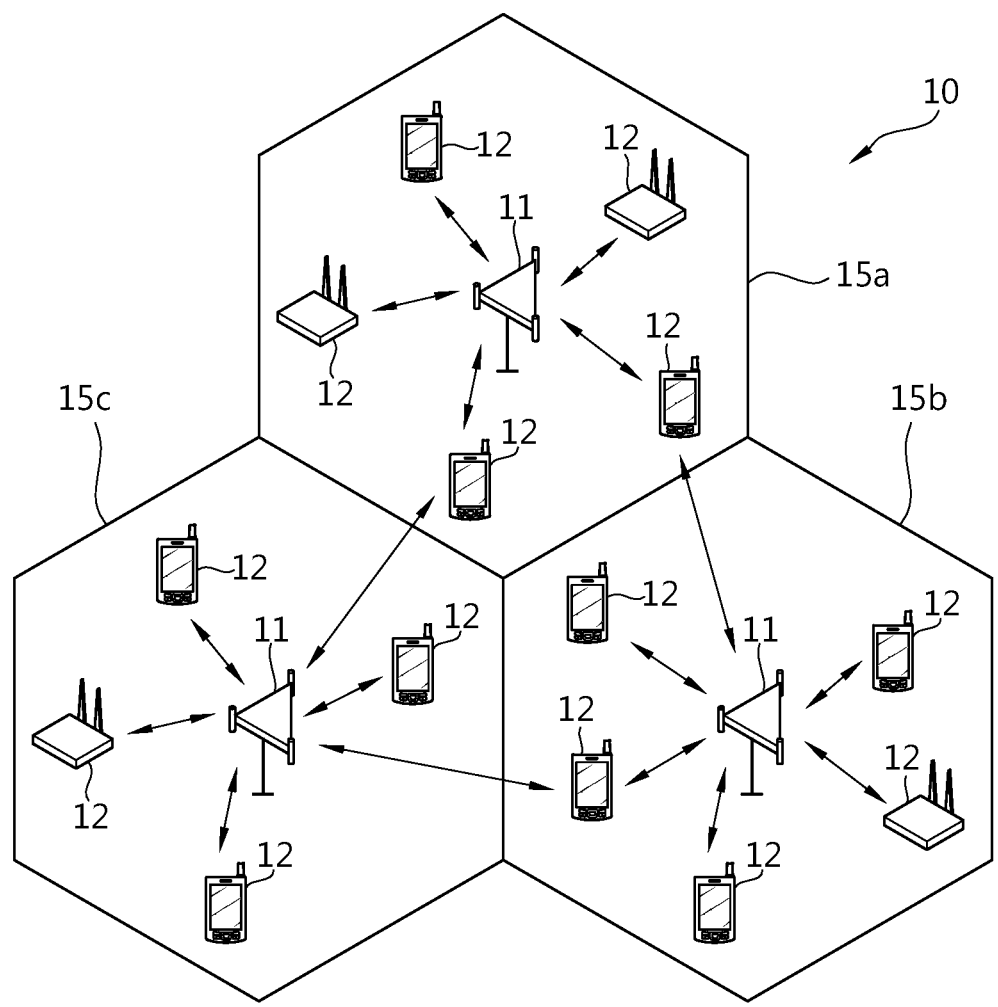
FIG. 1 shows a wireless communication system.

FIG. 1 shows a wireless communication system.

Referring to FIG. 1, a wireless communication system 10 includes at least one base station (BS) 11. Respective BSs 11 provide communication services to specific geographical regions 15a, 15b, and 15c. A user equipment (UE) 12 may be fixed or mobile, and may be referred to as another terminology, such as a mobile station (MS), an mobile terminal (MT), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink implies communication from the BS 11 to the UE 12, and an uplink implies communication from the UE 12 to the BS 11.

Layers of a radio interface protocol between the UE 12 and the BS 11 can be classified into a first layer (L1), a second layer (L2), and a third layer (L3) based on the lower three layers of the open system interconnection (OSI) model that is well-known in the communication system.

A physical layer, i.e., the first layer, is connected to a medium access control (MAC) layer, i.e., a higher layer, through a transport channel. Data between the MAC and physical layers is transferred through the transport channel. Further, between different physical layers, i.e., between a physical layer of a transmitting side and a physical layer of a receiving side, data is transferred through a physical channel.

A radio data link layer, i.e., the second layer, consists of a MAC layer, an RLC layer, and a PDCP layer. The MAC layer is a layer that manages mapping between a logical channel and the transport channel. The MAC layer selects a proper transport channel to transmit data delivered from the RLC layer, and adds essential control information to a header of a MAC protocol data unit (PDU).

The RLC layer is located above the MAC layer and supports reliable data transmission. In addition, the RLC layer segments and concatenates RLC service data units (SDUs) delivered from an upper layer to configure data having a suitable size for a radio section. The RLC layer of a receiver supports a reassemble function of data to restore an original RLC SDU from the received RLC PDUs.

The PDCP layer is used only in a packet exchange area, and can perform transmission by compressing a header of an IP packet to increase transmission efficiency of packet data in a radio channel.

The RRC layer, i.e., the third layer, exchanges radio resource control information between the UE and the network in addition to controlling of a lower layer. According to a communication state of the UE, various RRC states such as an idle mode, an RRC connected mode, etc., are defined, and transition between the RRC states is optionally possible. In the RRC layer, various procedures related to radio resource management are defined such as system information broadcasting, an RRC access management procedure, a multiple component carrier setup procedure, a radio bearer control procedure, a security procedure, a measurement procedure, a mobility management procedure (handover), etc.

Figure 2:
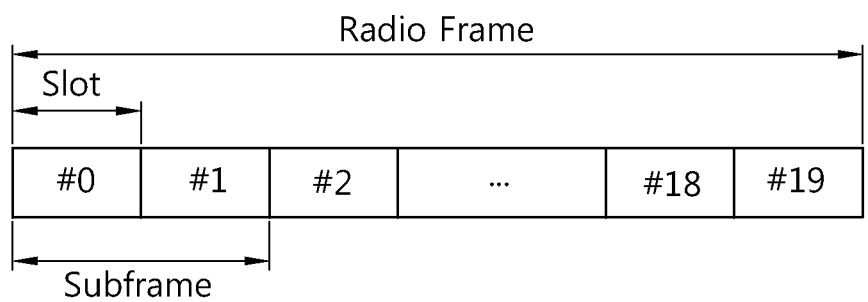
FIG. 2 shows a structure of a radio frame in $3^{rd}$ generation partnership project (3GPP) long term evolution (LTE).

FIG. 2 shows a structure of a radio frame in 3GPP LTE.

This may be found in the section 5 of 3GPP(3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)". Referring to FIG. 2, the radio frame consists of 10 subframes. One subframe consists of two slots. Slots included in the radio frame are indexed with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

One slot includes a plurality of orthogonal frequency division multiplexing (OFDM) symbols in a time domain, and includes a plurality of subcarriers in a frequency domain. Since the 3GPP LTE uses OFDMA in downlink transmission, the OFDM symbol is for representing one symbol period, and can be referred to as other terms. For example, the OFDM symbol can also be referred to as an SC-FDMA symbol when SC-FDMA is used as an uplink multiple-access scheme.

The above radio frame structure is shown for exemplary purposes only. Thus, the number of subframes included in the radio frame or the number of slots included in the subframe or the number of OFDM symbols included in the slot may change variously. In 3GPP LTE, it is defined such that one slot includes 7 OFDM symbols in a normal cyclic prefix (CP) and one slot includes 6 OFDM symbols in an extended CP.

A wireless communication system can be briefly classified into a system based on a frequency division duplex (FDD) scheme and a system based on a time division duplex (TDD) scheme. In the FDD scheme, uplink transmission and downlink transmission are achieved while occupying different frequency bands. In the TDD scheme, uplink transmission and downlink transmission are achieved at different times while occupying the same frequency band.

Figure 3:
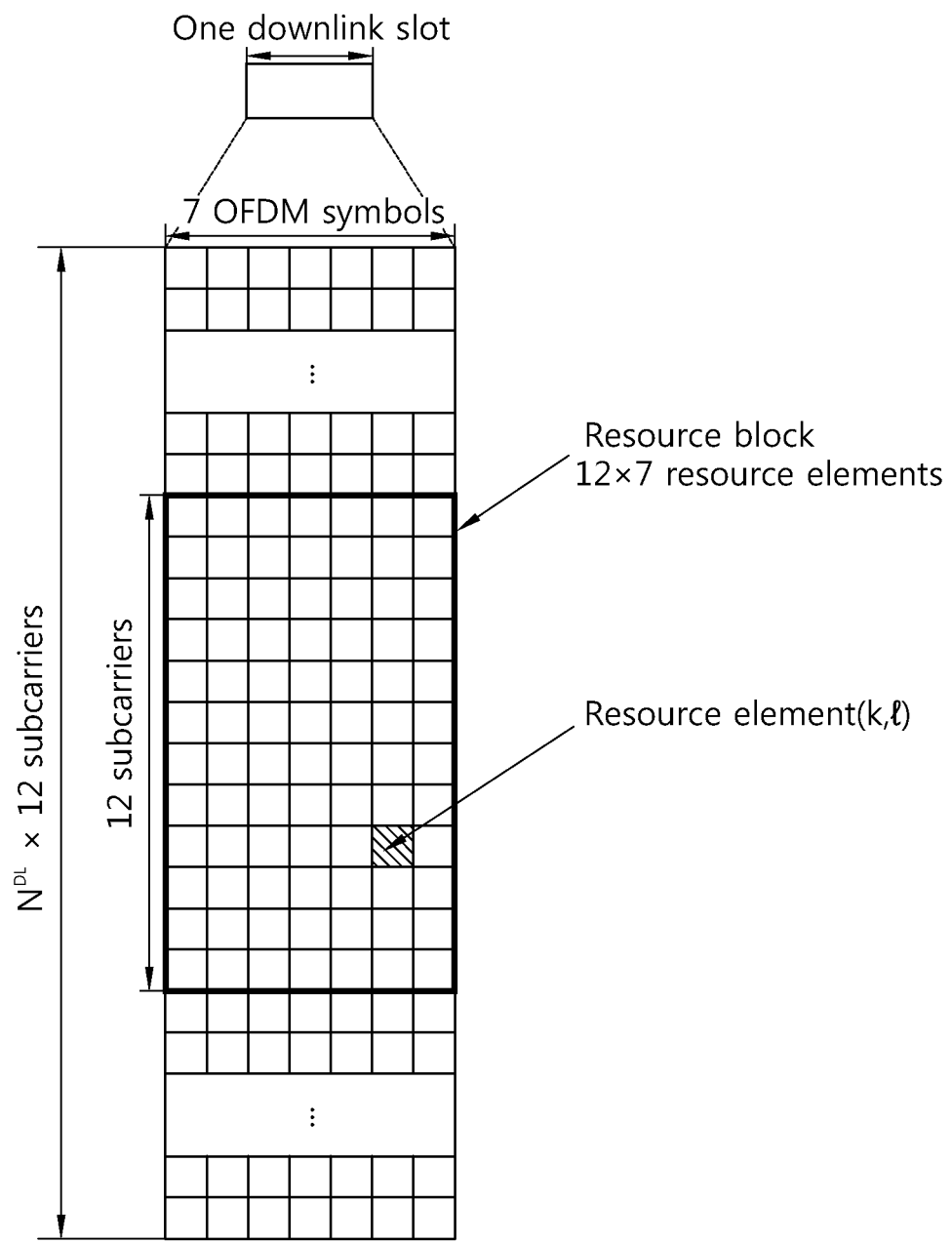
FIG. 3 shows an example of a resource grid for one downlink slot.

FIG. 3 shows an example of a resource grid for one downlink slot.

The downlink slot includes a plurality of OFDM symbols in a time domain, and includes $N_{RB}$ resource blocks (RBs) in a frequency domain. The RB includes a plurality of consecutive subcarriers in one slot in a unit of resource allocation. The number $N_{RB}$ of RBs included in the downlink slot depends on a downlink transmission bandwidth ($N^{DL}$: the number of RBs on a downlink transmission bandwidth) configured in a cell. For example, in the LTE system, $N_{RB}$ may be any one value in the range of 6 to 110.

Each element on the resource grid is referred to as a resource element (RE). The RE on the resource grid can be identified by an index pair (k,l) within the slot. Herein, $k(k=0, \ldots, N_{RB} \times 12-1)$ denotes a subcarrier index in the frequency domain, and $l(l=0, \ldots, 6)$ denotes an OFDM symbol index in the time domain.

Herein, although it is described herein that one RB includes 7×12 REs consisting of 7 OFDM symbols in the time domain and 12 subcarriers in the frequency domain for example, the number of OFDM symbols and the number of subcarriers in the RB are not limited thereto. Thus, the number of OFDM symbols and the number of subcarriers may change variously depending on a CP length, a frequency spacing, etc. For example, when using a normal CP, the number of OFDM symbols is 7, and when using an extended CP, the number of OFDM symbols is 6. In one OFDM symbol, the number of subcarriers may be selected from 128, 256, 512, 1024, 1536, and 2048. An uplink slot may have the same structure as the downlink slot.

Figure 4:
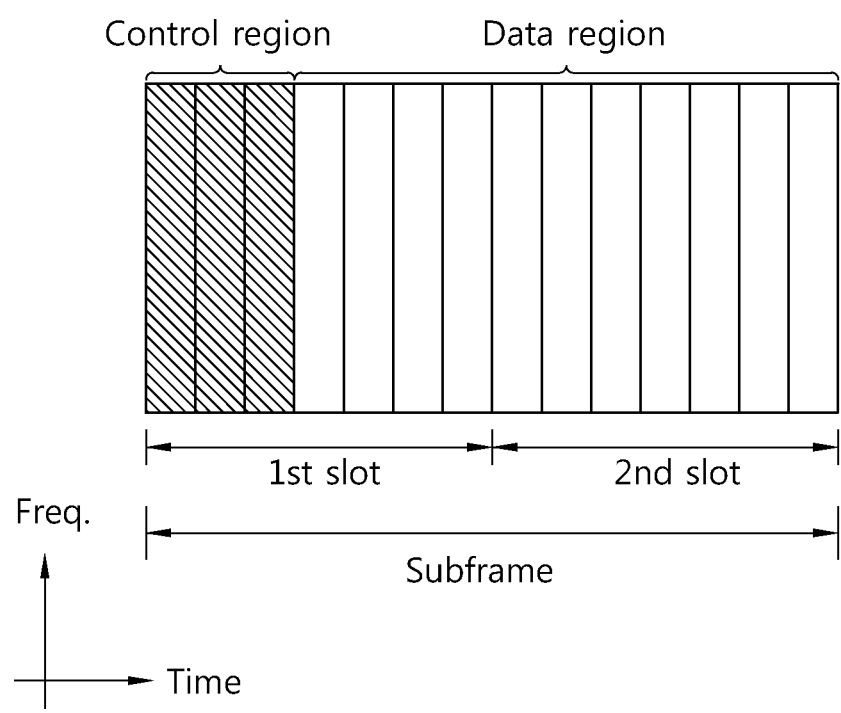
FIG. 4 shows a structure of a downlink subframe.

FIG. 4 shows a structure of a downlink subframe.

The downlink subframe includes two slots in a time domain, and each slot includes 7 OFDM symbols in a normal CP. Up to first 3 OFDM symbols (i.e., in case of 1.4

MHz bandwidth, up to first 4 OFDM symbols) of a first slot within the subframe correspond to a control region, and the remaining OFDM symbols correspond to a data region. Herein, control channels are allocated to the control region, and a physical downlink shared channel (PDSCH) is allocated to the data region.

A physical downlink control channel (PDCCH) can carry a downlink shared channel (DL-SCH)'s resource allocation (referred to as a downlink (DL) grant) and transmission format, uplink shared channel (UL-SCH)'s resource allocation information (referred to as an uplink (UL) grant), paging information on a PCH, system information on a DL-SCH, a resource allocation of a higher layer control message such as a random access response transmitted through a PDSCH, a transmission power control command for individual UEs included in any UE group, activation of a voice over Internet (VoIP), etc. A plurality of PDCCHs can be transmitted in the control region, and the UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for a system information block (SIB), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
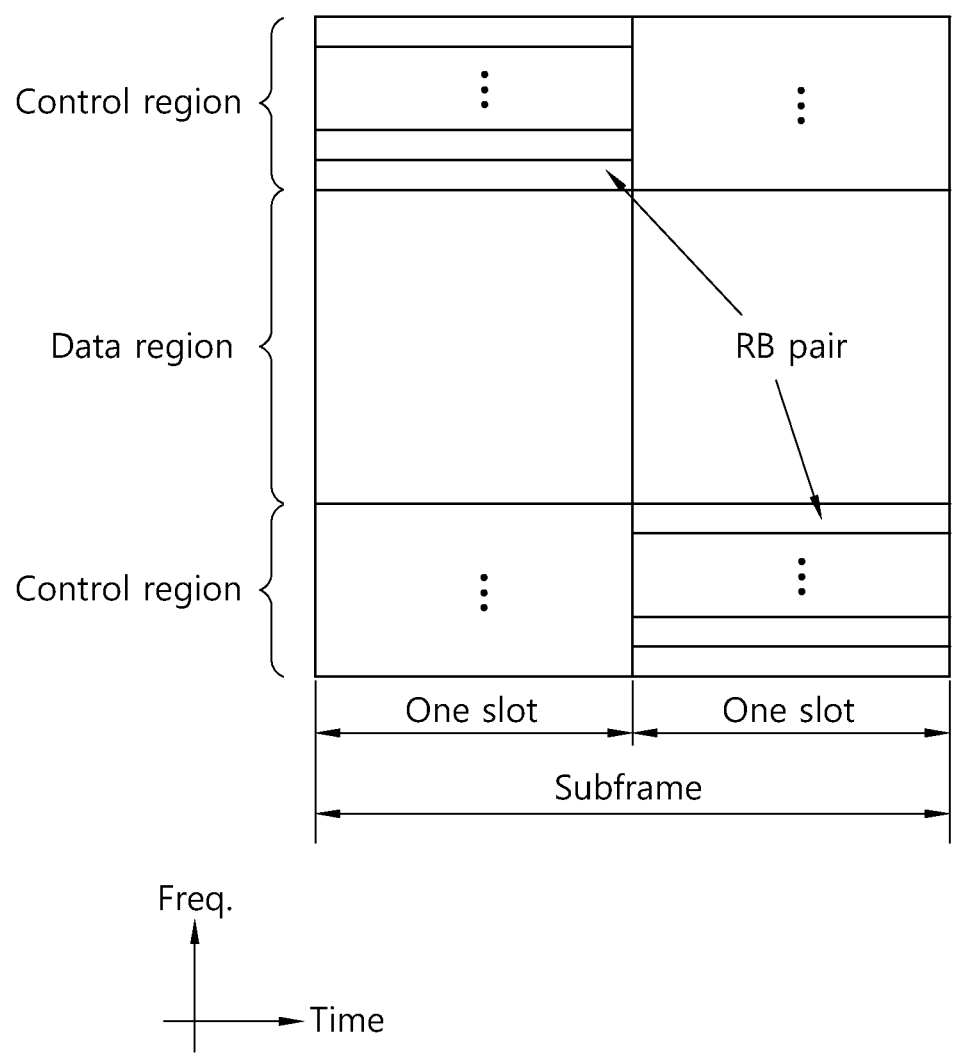
FIG. 5 shows a structure of an uplink subframe.

FIG. 5 shows a structure of an uplink subframe.

The uplink subframe can be divided into a control region and a data region. A physical uplink control channel (PUCCH) for carrying uplink control information (UCI) is allocated to the control region. A physical uplink shared channel (PUSCH) for carrying uplink data and/or the UCI is allocated to the data region. In this sense, the control region can be called a PUCCH region, and the data region can be called a PUSCH region. According to configuration information indicated by a higher layer, a UE may support simultaneous transmission of the PUSCH and the PUCCH or may not support simultaneous transmission of the PUSCH and the PUCCH.

The PUSCH is mapped to an uplink shared channel (UL-SCH) which is a transport channel. UL data transmitted on the PUSCH may be a transport block which is a data block for the UL-SCH transmitted during TTI. The transport block may be user information. Alternatively, the uplink data may be multiplexed data. The multiplexed data may be attained by multiplexing control information and the transport block for the UL-SCH. Examples of the UCI to be multiplexed with the uplink data include channel status information (CSI) such as a channel quality indicator (CQI), a precoding matrix indicator (PMI), a rank indicator (RI), a precoder type indication (PTI), etc., and a hybrid automatic repeat request (HARQ), etc. (Although CQI/PMI, RUPTI, etc., are exemplified as the CSI, the present invention is not limited thereto. That is, the CSI includes information required by the BS to perform downlink scheduling). As such, feedback transmission of the UCI is transmission in the data region together with the UCI or the uplink data. The feedback transmission will be described below in greater detail. Only the UCI may be transmitted through the PUSCH.

The PUCCH for one UE is allocated in an RB pair in a subframe. RBs belonging to the RB pair occupy different subcarriers in each of a $1^{st}$ slot and a $2^{nd}$ slot. That is, a frequency occupied by the RBs belonging to the RB pair to which the PUCCH is allocated changes at a slot boundary. This is called that the RB pair allocated to the PUCCH is frequency-hopped at the slot boundary. Since the UE transmits UCI on a time basis through different subcarriers, a frequency diversity gain can be obtained.

The PUCCH carries various types of control information according to a format. A PUCCH format 1 carries a scheduling request (SR). In this case, an on-off keying (OOK) scheme can be used. A PUCCH format 1a carries an acknowledgement/non-acknowledgement (ACK/NACK) modulated using binary phase shift keying (BPSK) with respect to one codeword. A PUCCH format 1b carries an ACK/NACK modulated using quadrature phase shift keying (QPSK) with respect to two codewords. A PUCCH format 2 carries a channel quality indicator (CQI) modulated using QPSK. PUCCH formats 2a and 2b carry CQI and ACK/NACK. A PUCCH format 3 is modulated using QPSK, and can carry a plurality of ACK/NACK signals and an SR.

As described above, uplink control information (UCI), in particular, channel status information can be transmitted in a piggyback manner through a PUSCH.

Figure 6:
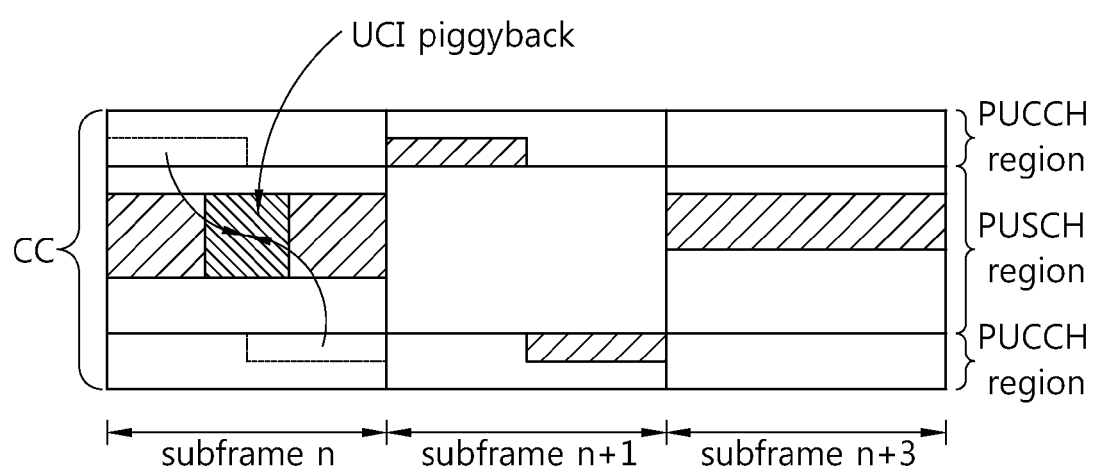
FIG. 6 shows an example of a subframe in which uplink control information (UCI) is transmitted in a piggyback (or multiplexing) manner.

FIG. 6 shows an example of a subframe in which UCI is transmitted in a piggyback (or multiplexing) manner.

Referring to FIG. 6, in a subframe n, a UE does not transmit UCI via a PUCCH region but transmits it together with uplink data via a PUSCH region. On the other hand, the UCI is transmitted in a subframe n+1 via only the PUCCH region, and the uplink data is transmitted in a subframe n+2 via only the PUSCH region. Similarly to the case of the subframe n, when the UCI is transmitted together with the data via the PUSCH region, it is called UCI piggyback transmission.

In 3GPP LTE Rel-8, in an uplink case, single-carrier transmission is maintained to effectively utilize a power amplifier of a UE since the single-carrier transmission has a good peak-to-average power ratio (PAPR) property and a good cubic metric (CM) property which have an effect on performance of the power amplifier. In the 3GPP LTE Rel-8, in case of PUSCH transmission, the single-carrier property is maintained by performing discrete Fourier transform (DFT) spreading on data to be transmitted, and in case of PUCCH transmission, the single-carrier property is maintained by transmitting control information carried on a sequence having the single-carrier property. However, the single-carrier property is not maintained when the data subjected to the DFT spreading is allocated to non-consecutive subcarriers in a frequency domain or when a PUSCH and a PUCCH are simultaneously transmitted. Therefore, if the PUCCH and the PUSCH are predetermined to be transmitted simultaneously in the same subframe, the single-carrier property can be maintained by transmitting UCI to be transmitted through the PUCCH together with data through the PUSCH, that is, by performing transmission in a piggyback manner.

Figure 7:
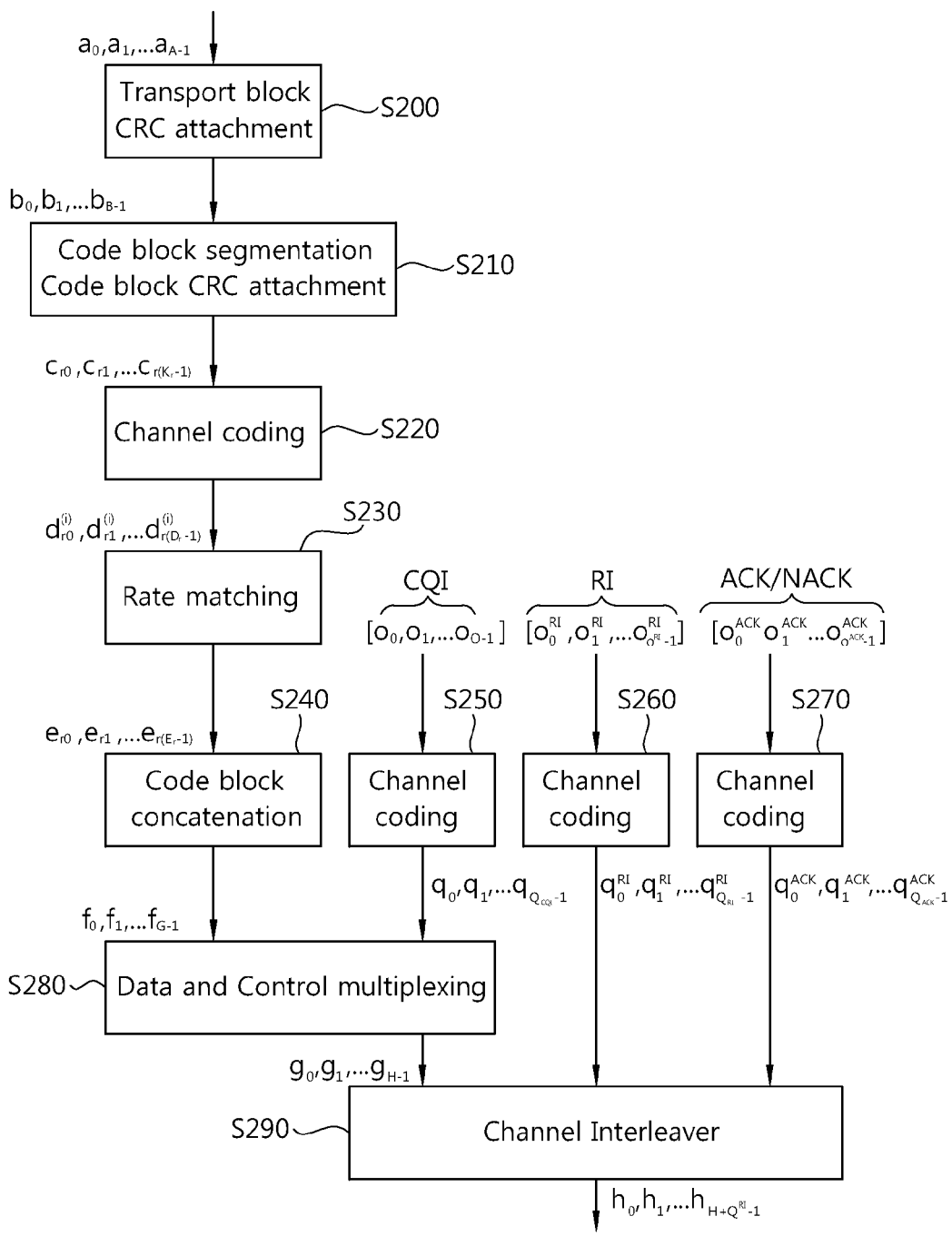
FIG. 7 shows a process of handling uplink data and UCI when the UCI is transmitted through a physical uplink shared channel (PUSCH) in a piggyback (or multiplexing) manner.

FIG. 7 shows a process of handling uplink data and UCI when the UCI is transmitted through a PUSCH in a piggyback (or multiplexing) manner.

Referring to FIG. 7, data bits $a_0, a_1, \ldots, a_{A-1}$ are provided in every TTI in a format of one transport block. First, cyclic redundancy check (CRC) parity bits $p_0, p_1, \ldots, p_{L-1}$ are attached to the data bits $a_0, a_1, \ldots, a_{A-1}$ to generate CRC-attached bits $b_0, b_1, \ldots, b_{B-1}$ (step 200). Herein, B=A+L. Equation 1 below shows a relationship between $a_k$ and $b_k$.

$$b_k = a_k \text{ for } k=0,1,\ldots,A-1$$

$$b_k = p_{k-A} \text{ for } k=A,A+1,\ldots,A+L-1 \quad \text{[Equation 1]}$$

The CRC-attached bits $b_0, b_1, \ldots, b_{B-1}$ are segmented in a code block unit, and the CRC parity bits are re-attached in the code block unit (step 210). $c_{r0}, c_{r1}, \ldots, c_{r(Kr-1)}$ denote a bit sequence output after the code block segmentation. Herein, if the total number of code blocks is C, r denotes a code block number, and Kr denotes the number of bits for the code block number r.

Channel coding is performed on a bit sequence for a given code block (step 220). $d^{(i)}_0, d^{(i)}_1, \ldots, d^{(i)}_{D-1}$ denote encoded bits, D denotes the number of encoded bits for each output stream, and i denotes an index of a bit stream output from an encoder.

Rate matching is performed on the encoded bits (step 230). Then, code block concatenation is performed on the rate-matched bits (step 240). As a result, a data bit sequence $f_0, f_1, \ldots, f_{G-1}$ is generated. Rate matching implies that an amount of data to be transmitted every transmission unit time, e.g., TTI, is adjusted to a maximum transmission amount of an actual channel. Herein, G denotes the total number of encoded bits used to transmit bits other than bits that are used in control information transmission when the control information is multiplexed on a PUSCH.

The control information (i.e., uplink control information) can be multiplexed together with data (i.e., uplink data). The data and the control information can use different coding rates by allocating a different number of coded symbols for transmission thereof. Examples of the control information include a channel quality indicator (CQI), a rank indicator (RI), an acknowledgement/not-acknowledgement (ACK/NACK), etc.

Channel coding is performed on CQI values $o_0, o_1, \ldots, o_{O-1}$ (where O is the number of CQI bits) to generate a control information bit sequence $q_0, q_1, \ldots, q_{QCQI-1}$ (step 250). Channel coding is performed on RI values $o_0^{RI}, o_1^{RI}, \ldots, o_{oRI-1}^{RI}$ to generate a control information bit sequence $q_0^{RI}, q_1^{RI}, \ldots, q_{QRI-1}^{RI}$ (step S260). Likewise, channel coding is performed on ACK/NACK values $o_0^{ACK}$ or ACK/NACK values $o_0^{ACK}, o_1^{ACK}, \ldots, o_{oACK-1}^{ACK}$ to generate a control information bit sequence $q_0^{ACK}, q_1^{ACK}, \ldots, q_{QACK-1}^{ACK}$ (step S270).

A data bit sequence $f_0, f_1, \ldots, f_{G-1}$ is generated as described above and is multiplexed together with the control information bit sequence $q_0, q_1, \ldots, q_{QCQI-1}$ of the CQI into a multiplexed sequence $g_0, g_1, \ldots, g_{QCQI-1}$ (step 280). In a process of multiplexing, the control information bit sequence $q_0, q_1, \ldots, q_{QCQI-1}$ of the CQI can be arranged first and thereafter the data bit sequence $f_0, f_1, \ldots, f_{G-1}$ can be arranged. That is, if H=G+Q, [$g_0, g_1, \ldots, g_{H-1}$] may be configured such as [$q_0, q_1, \ldots, q_{QCQI-1}, f_0, f_1, \ldots, f_{G-1}$].

The multiplexed sequence $g_0, g_1, \ldots, g_{H-1}$ is mapped to a modulation sequence $h_0, h_1, \ldots, h_{H'-1}$ by a channel interleaver (step 280). In addition, the control information bit sequence of the RI or the ACK/NACK is mapped to modulation sequences $h_0, h_1, \ldots, h_{H'-1}$ by the channel interleaver. Herein, $h_i$ is a modulation symbol on a constellation, where H'=H+$Q_{RI}$. Each modulation symbol of the modulation sequence $h_0, h_1, \ldots, h_{H'-1}$ is mapped to a resource element for the PUSCH. The resource element is a subframe allocation unit defined with one SC-FDMA symbol (or OFDMA symbol) and one subcarrier.

Figure 8:
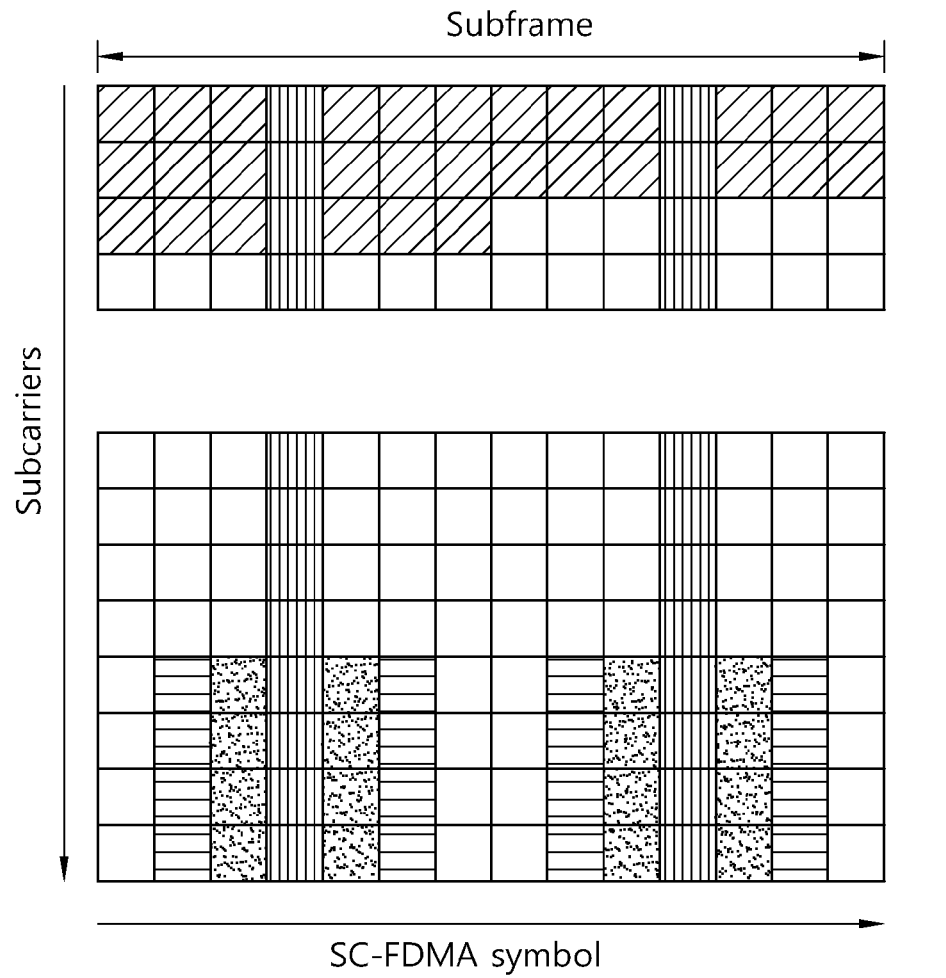
FIG. 8 shows an example of mapping a resource to a PUSCH region of a subframe n of FIG. 6 by using a process of FIG. 7.

FIG. 8 shows an example of mapping a resource to a PUSCH region of a subframe n of FIG. 6 by using the process of FIG. 7.

A multiplexing method in a PUSCH region may differ depending on a type of UCI. Referring to FIG. 8, in a PUSCH region of a subframe, a demodulation reference signal (DM RS) is allocated to some symbols in a $1^{st}$ slot or a $2^{nd}$ slot. The DM RS is a reference signal used for demodulation of UCI and uplink data transmitted in the PUSCH region. An example in which the DM RS is allocate to a $4^{th}$ symbol of the $1^{st}$ slot and the $2^{nd}$ slot is shown in FIG. 8.

A part of the UCI may be CQI/PMI (control information type 1) which can be allocated from a $1^{st}$ symbol of a subframe to a last available symbol with respect to one subcarrier, and thereafter can be allocated to a next subcarrier of a frequency domain. That is, the CQI/PMI can be allocated from the $1^{st}$ symbol to the last symbol of the subframe except for a symbol to which the DM RS is allocated. Herein, the subcarrier may be a physical subcarrier in the frequency domain, and if it is rearranged by using precoding (e.g., discrete Fourier transform precoding) before modulation symbols are mapped to a physical subcarrier of the frequency domain, may imply a subcarrier in a virtual region before the rearrangement. Rate matching is used when the CQI/PMI is transmitted together with uplink data in the PUSCH region.

A part of the UCI may be ACK/NACK (control information type 2) which can be allocated to a symbol adjacent to the symbol to which the DM RS is allocated. The number of symbols to which the ACK/NACK is allocated may be up to 4. By using such an allocation method, the ACK/NACK can use the best channel estimation result. The ACK/NACK can be allocated to a symbol adjacent to the symbol to which the DM RS is allocated after puncturing data, i.e., PUSCH data.

Another part of the UCI may be RI/PTI (control information type 3) which can be allocated to a symbol adjacent to the symbol to which the ACK/NACK can be allocated.

The aforementioned UCI piggyback transmission can be applied to a carrier aggregation system. First, the carrier aggregation system will be described.

Figure 9:
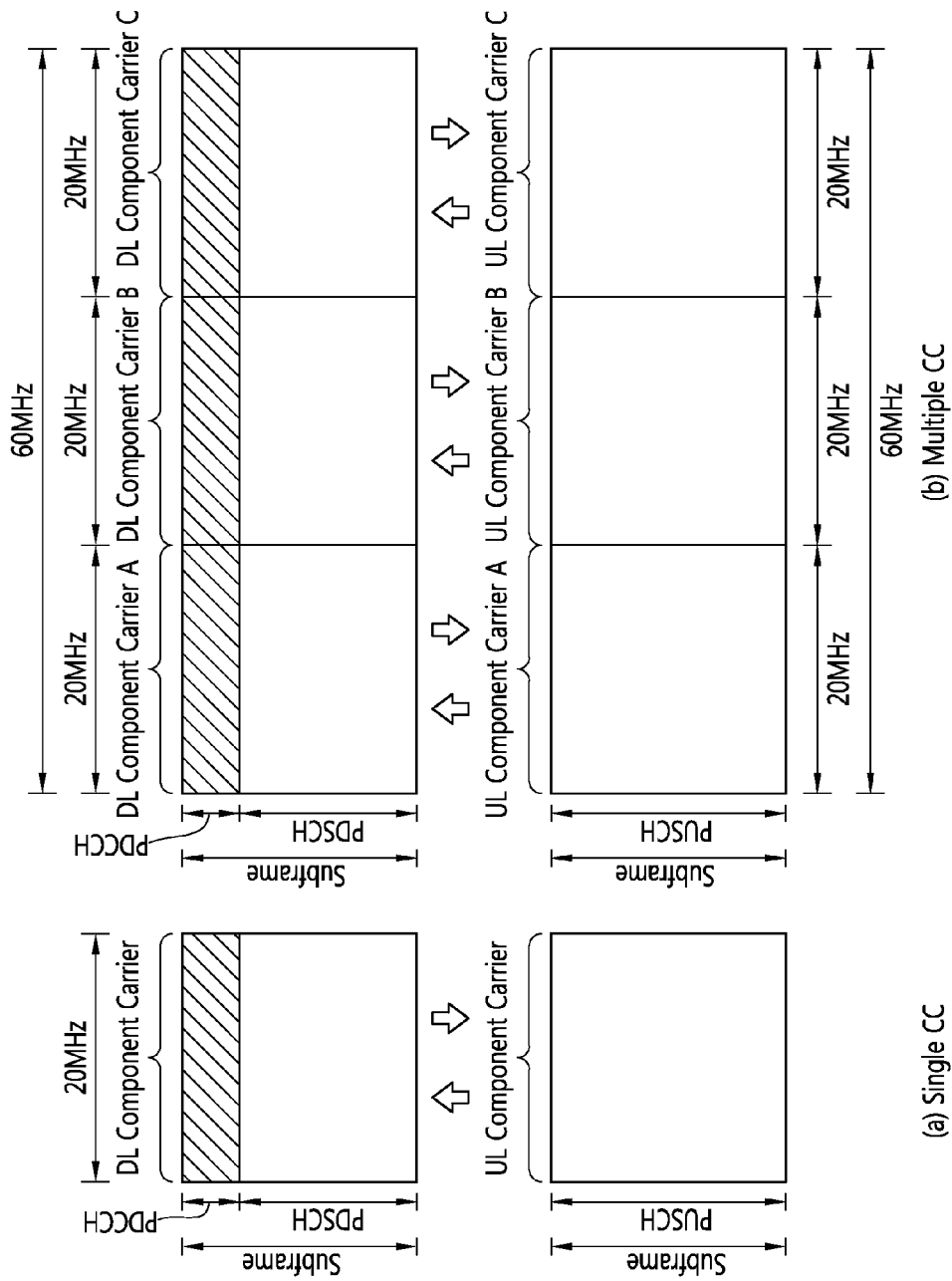
FIG. 9 shows an example of comparing a carrier aggregation system with a single carrier system.

FIG. 9 shows an example of comparing a carrier aggregation system with a single carrier system.

Referring to FIG. 9, the single-carrier system supports only one carrier for a UE in an uplink (UL) and a downlink (DL). Although the carrier may have various bandwidths, only one carrier is assigned to the UE. Meanwhile, the multiple-carrier system can assign multiple CCs, i.e., DL CCs A to C and UL CCs A to C, to the UE. For example, three 20 MHz CCs can be assigned to the UE to allocate a 60 MHz bandwidth.

The carrier aggregation system can be divided into a contiguous carrier aggregation system in which carriers to be aggregated are contiguous to each other and a non-contiguous carrier aggregation system in which carriers are separated from each other. Hereinafter, when it is simply called the carrier aggregation system, it should be interpreted such that both cases of contiguous CCs and non-contiguous CCs are included.

A CC which is a target when aggregating one or more CCs can directly use a bandwidth that is used in the legacy system in order to provide backward compatibility with the legacy system. For example, a 3GPP LTE system can support a bandwidth of 1.4 MHz, 3 MHz, 5 MHz, 10 MHz, 15 MHz, and 20 MHz, and a 3GPP LTE-A system can configure a wideband of 20 MHz or higher by using only the bandwidth of the 3GPP LTE system. Alternatively, the wideband can be configured by defining a new bandwidth without having to directly use the bandwidth of the legacy system.

A system band of a wireless communication system is divided into a plurality of carrier frequencies. Herein, the carrier frequency implies a center frequency of a cell. Hereinafter, the cell may imply a DL frequency resource and a UL frequency resource. Alternatively, the cell may also imply a combination of a DL frequency resource and an optional UL frequency resource. In general, if carrier aggregation (CA) is not considered, UL and DL frequency resources may always exist in pair in one cell.

In order to transmit and receive packet data via a specific cell, the UE first has to complete a configuration of the specific cell. Herein, the configuration implies a state where system information required for data transmission and reception for the cell is completely received. For example, the configuration may include an overall procedure that requires common physical layer parameters necessary for data transmission and reception, MAC layer parameters, or parameters necessary for a specific operation in an RRC layer. A cell of which configuration is complete is in a state capable of immediately transmitting and receiving a packet upon receiving only information indicating that packet data can be transmitted.

The cell in a state of completing its configuration can exist in an activation or deactivation state. Herein, the activation implies that data transmission or reception is performed or is in a ready state. The UE can monitor or receive a control channel (i.e., PDCCH) and a data channel (i.e., PDSCH) of an activated cell in order to confirm a resource (e.g., frequency, time, etc.) allocated to the UE.

The deactivation implies that data transmission or reception is impossible and measurement or transmission/reception of minimum information is possible. The UE can receive system information (SI) required to receive a packet from a deactivated cell. On the other hand, in order to confirm the resource (e.g., frequency, time, etc.) allocated to the UE, the UE does not monitor or receive a control channel (i.e., PDCCH) and a data channel (i.e., PDSCH) of the deactivated cell.

A cell can be classified into a primary cell, a secondary cell, and a serving cell.

The primary cell implies a cell that operates at a primary frequency. Further, the primary cell implies a cell in which the UE performs an initial connection establishment procedure or a connection re-establishment procedure with respect to the BS or a cell indicated as the primary cell in a handover procedure.

The secondary cell implies a cell that operates at a secondary frequency. Once an RRC connection is established, the secondary cell is used to provide an additional radio resource.

The serving cell is configured with the primary cell in case of a UE of which carrier aggregation is not configured or which cannot provide the carrier aggregation. If the carrier aggregation is configured, the term 'serving cell' implies a cell configured for the UE, and a plurality of serving cells can be configured. The plurality of serving cells can be configured with a set consisting of a primary cell and one or a plurality of cells among secondary cells.

A primary component carrier (PCC) denotes a CC corresponding to the primary cell. The PCC is a CC that establishes an initial connection (or RRC connection) with the BS among several CCs. The PCC serves for a connection (or RRC connection) for signaling related to a plurality of CCs, and is a CC that manages UE context which is connection information related to the UE. In addition, the PCC establishes a connection with the UE, and thus always exists in an activation state when in an RRC connected mode. A DL CC corresponding to the primary cell is called a DL primary component carrier (DL PCC), and a UL CC corresponding to the primary cell is called a UL primary component carrier (UL PCC).

A secondary component carrier (SCC) implies a CC corresponding to the secondary cell. That is, the SCC is a CC allocated to the UE in addition to the PCC. The SCC is an extended carrier used by the UE for additional resource allocation or the like in addition to the PCC, and can operate either in an activation state or a deactivation state. A DL CC corresponding to the secondary cell is called a DL secondary CC (DL SCC), and a UL CC corresponding to the secondary cell is called a UL secondary CC (UL SCC).

The primary cell and the secondary cell have the following features.

First, the primary cell is used for PUCCH transmission. Second, the primary cell is always activated, whereas the secondary cell is a cell which is activated/deactivated according to a specific condition. Third, when the primary cell experiences a radio link failure (RLF), RRC re-establishment is triggered. Fourth, the primary cell can change by a handover procedure accompanied by a random access channel (RACH) procedure or security key modification. Fifth, non-access stratum (NAS) information is received through the primary cell. Sixth, the primary cell always consists of a pair of a DL PCC and a UL PCC. Seventh, for each UE, a different CC can be configured as the primary cell. Eighth, a procedure such as reconfiguration, adding, and removal of the primary cell can be performed by an RRC layer. When adding a new secondary cell, RRC signaling can be used for transmission of system information of a dedicated secondary cell.

Regarding a CC constructing the serving cell, a DL CC can construct one serving cell. Further, the DL CC can be connected to a UL CC to construct one serving cell. However, the serving cell is not constructed only with one UL CC.

Activation/deactivation of a CC is equivalent to the concept of activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to a cell.

The number of CCs aggregated between a DL and a UL may be determined differently. Symmetric aggregation is when the number of DL CCs is equal to the number of UL CCs. Asymmetric aggregation is when the number of DL CCs is different from the number of UL CCs. In addition, the CCs may have different sizes (i.e., bandwidths). For example, if 5 CCs are used to configure a 70 MHz band, it can be configured such as 5 MHz CC(carrier #0)+20 MHz CC(carrier #1)+20 MHz CC(carrier #2)+20 MHz CC(carrier #3)+5 MHz CC(carrier #4).

As described above, unlike a single-carrier system, the carrier aggregation system can support a plurality of serving cells, i.e., a plurality of component carriers (CCs). That is, one UE can receive a plurality of PDSCHs via a plurality of DL CCs. In addition, the UE can transmit channel status information via one UL CC, e.g., a PUCCH of a UL PCC, among the plurality of UL CCs. However, in the carrier aggregation system, simultaneous transmission of a PUCCH and a PUSCH may be configured for the UE or may not be configured for the UE.

If the simultaneous transmission of the PUCCH and the PUSCH is not configured, the UE transmits channel status information (CSI) by piggybacking or multiplexing it on the PUSCH if PUSCH transmission exists in a subframe which must transmit the CSI.

In this case, the CSI can be multiplexed by puncturing a PUSCH resource according to a type of the CSI or by decreasing an amount of coded bits for PUSCH data transmission by the use of rate matching performed on a PUSCH resource part remaining after occupying some of PUSCH resources.

The BS can configure a PUCCH transmission timing period for CSI transmission of the UE, a timing offset, a PUCCH code/cyclic shift amount, etc. The UE transmits periodic CSI for a plurality of DL CCs through a PUCCH to the BS according to the configuration.

Figure 10:
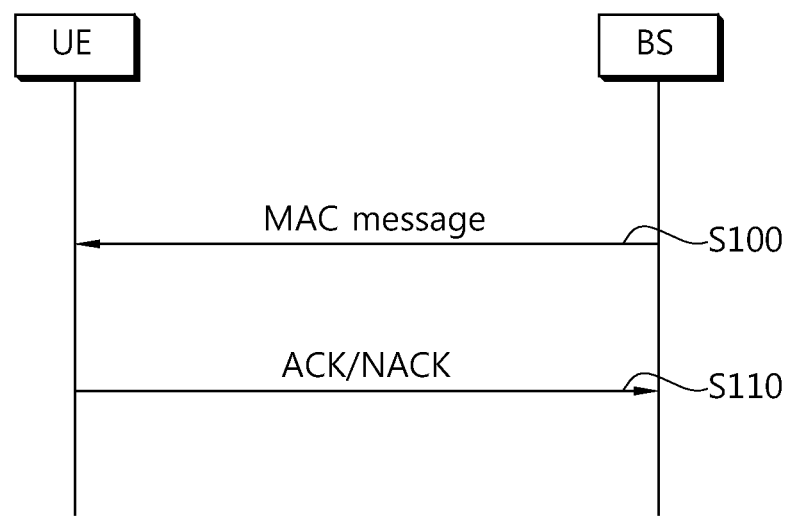
FIG. 10 shows an example of a state change of a serving cell between a base station (BS) and a user equipment (UE) in a carrier aggregation system.

FIG. 10 shows an example of a state change of a serving cell between a BS and a UE in a carrier aggregation system.

Referring to FIG. 10, the BS transmits a media access control (MAC) message to the UE (step S100). The MAC message may indicate a state change of some serving cells among a plurality of serving cells allocated to the UE. That is, the BS may use the MAC message to deactivate an activated serving cell or to activate a deactivated serving cell. Upon receiving the MAC message, the UE feeds back ACK/NACK in response thereto (step S110).

That is, in a carrier aggregation system such as LTE-A, a BS may transmit a signal (e.g., a MAC message, but the present invention is not limited thereto) indicating a state change of a serving cell (more specifically, a DL CC of the serving cell) to a UE, and may optionally activate or deactivate some DL CCs among the allocated plurality of DL CCs. The UE does not transmit CSI for a deactivated DL CC. However, in such a signaling process, an activation/deactivation state for a specific DL CC may be incorrectly recognized in a case where the UE transmits ACK but the BS receives NACK or where a MAC message is incorrectly decoded. Alternatively, a time to apply the state change of the activation/deactivation depending on the MAC message may be incorrectly recognized between the BS and the UE.

For example, there may be a case where, even if the BS instructs to activate a DL CC constituting a specific serving cell, the UE may recognize that the DL CC is deactivated. When such an error occurs, a UE for which simultaneous transmission of a PUCCH and a PUSCH is disabled may have to transmit periodic CSI for a specific DL CC in a subframe for transmitting the PUSCH. In this case, since the UE recognizes that the DL CC is deactivated, the CSI is not multiplexed on the PUSCH. However, since the BS recognizes that the DL CC is activated, it is recognized that the CSI is multiplexed on the PUSCH. As a result, the BS may fail to properly decode PUSCH data (on the contrary, the same is also true when the UE recognizes that a specific DL CC is activated, and the BS recognizes that the specific DL CC is deactivated). For example, if CSI is multiplexed on a PUSCH by performing rate matching on coded bits of the PUSCH data, the BS misunderstands a sorting order of the coded bits of the PUSCH data. Accordingly, a fatal error may occur in an HARQ combination process performed on the PUSCH data by the BS.

Hereinafter, a method for preventing such an error will be described.

1. <Embodiment 1>

The embodiment 1 assumes a case where a UE is configured to transmit periodic CSI for one DL CC through a PUCCH in any subframe. This is related to how to feed back CSI when a DL CC for which periodic CSI is fed back in the subframe is a deactivated DL CC. The same is also true in an embodiment 1-1.

Figure 11:
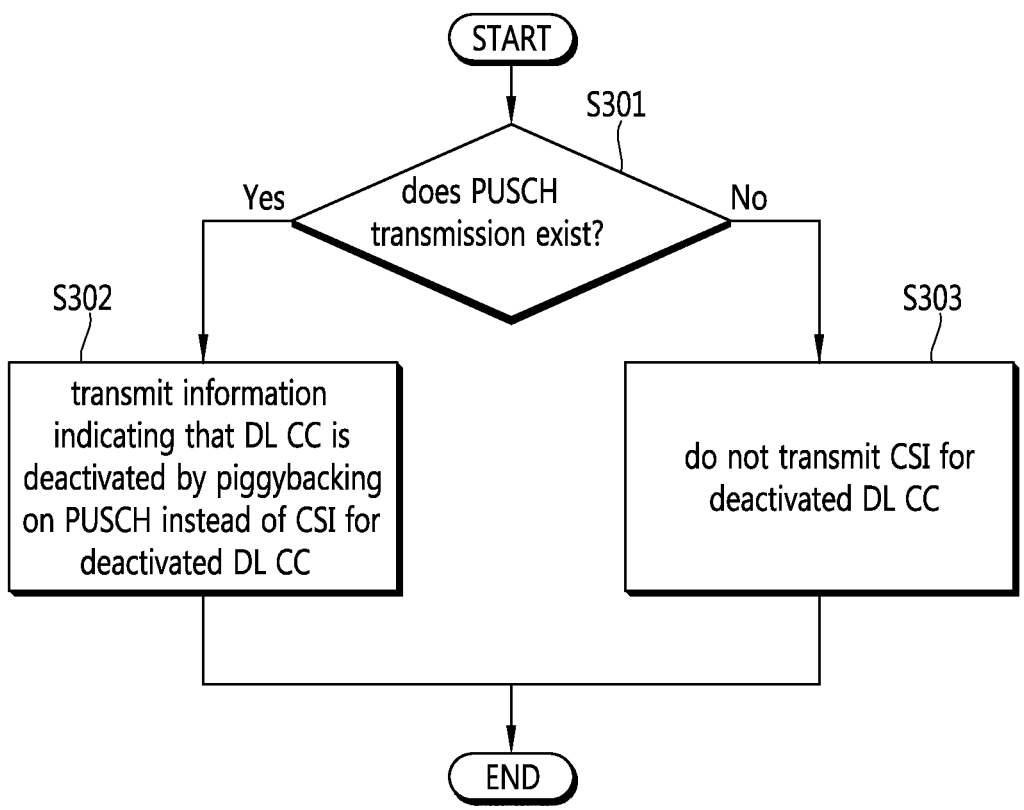
FIG. 11 is a flowchart showing a channel status information (CSI) transmission method according to an embodiment 1 of the present invention.

FIG. 11 is a flowchart showing a CSI transmission method according to an embodiment 1 of the present invention.

Referring to FIG. 11, a UE determines whether PUSCH transmission exists in a subframe configured to transmit periodic CSI (step S301). If the PUSCH transmission does not exist in the subframe, CSI for a deactivated DL CC is not transmitted through a PUCCH (step S303). That is, PUCCH transmission itself does not exist.

Otherwise, if the PUSCH transmission exists in the subframe configured to transmit the periodic CSI, deactivation confirmation information indicating that the DL CC is deactivated is transmitted through the PUSCH in a piggyback manner instead of CSI for the deactivated DL CC (step S302).

The deactivation confirmation information and PUSCH data can be multiplexed by using rate matching or puncturing performed on a PUSCH resource. In this case, the deactivation confirmation information can be transmitted by performing rate matching or puncturing on a PUSCH resource with the same amount of CSI information of a corresponding DL CC in a PUSCH region of a corresponding subframe. For example, the deactivation confirmation information may have the same payload size as CSI information of the DL CC, and may indicate the deactivation state by using one of codewords used to transmit the CSI information of the DL CC. Alternatively, a 1-bit or 2-bit (or higher-bit) field can be added to the payload of the CSI information of the DL CC to report whether it is deactivated or not, or to report whether the CSI information is fed back.

CSI transmission is not performed in the conventional technique if a DL CC for which CSI is fed back in a subframe configured to transmit periodic CSI is a deactivated DL CC. On the contrary, the present invention differs in that, when PUSCH transmission is performed in the subframe configured to transmit the periodic CSI, information for confirming that the DL CC is deactivated, that is, deactivation confirmation information, is transmitted in a piggyback manner through a PUSCH if the DL CC for which the CSI is fed back is the deactivated DL CC. In this case, the deactivation confirmation information is multiplexed by occupying a PUSCH resource with the same amount as the CSI information of the DL CC. Therefore, by using the method according to the embodiment 1, the BS can correctly decode PUSCH data irrespective of whether the UE correctly recognizes the activation/deactivation state for the DL CC for which the CSI is fed back in the subframe configured to transmit the periodic CSI. In addition, the BS can confirm whether the UE recognizes the DL CC as the deactivated DL CC or as the activated DL CC.

The aforementioned embodiment 1 can be modified to the embodiment 1-1 described below.

<Embodiment 1-1>

In a case where a UE is configured to transmit periodic CSI for one DL CC through a PUCCH in any subframe, a PUCCH for the CSI is not transmitted for a deactivated DL CC if PUSCH transmission does not exist in the subframe. On the other hand, if the PUSCH transmission exists in the subframe, instead of piggybacking the CSI through the PUSCH, a PUSCH resource part to be occupied, if the CSI is piggybacked on the PUSCH, can be transmitted as NULL by performing puncturing or rate matching. That is, the PUSCH transmission can be performed by not carrying a signal on a PUSCH resource to be occupied by the CSI for the DL CC or by carrying predetermined dummy bits or symbols streams. The PUSCH resource is used to transmit deactivation confirmation information in the embodiment 1, whereas the deactivation confirmation information is transmitted as NULL in the embodiment 1-1. According to the embodiment 1-1, a BS can correctly perform PUSCH decoding irrespective of whether a UE transmits CSI information through a PUSCH in a piggyback manner in a corresponding subframe.

2. <Embodiment 2>

The embodiment 2 assumes a case where a plurality of serving cells, that is, a plurality of DL CCs are allocated to a UE and periodic CSI is transmitted for each DL CC. Periodic CSI for one DL CC selected from the plurality of DL CCs can be fed back through a PUCCH in one subframe. A method of selecting one DL CC among a plurality of DL CCs may be a method in which a DL CC having a lowest cell index has a highest priority. However, this is for exemplary purposes only, and thus the present invention is not limited thereto. The embodiment 2 relates to an operation of the UE when the UE determines that a DL CC selected in this situation as a deactivated DL CC.

For example, assume that four DL CCs (e.g., a DL CC 1, a DL CC 2, a DL CC 3, and a DL CC 4) are allocated to the UE. In this case, it is assumed that a BS reports to the UE that the DL CC 1 and the DL CC 2 are deactivated and the DL CC 3 and the DL CC 4 are activated. Herein, it is assumed that an error occurs and thus the UE incorrectly recognizes that the DL CC 1 to the DL CC 4 are all activated. In this case, periodic CSI transmission may be configured for the DL CC 2, the DL CC 3, and the DL CC 4 in any subframe, and a priority of transmitting the periodic CSI may be determined to DL CC 1>DL CC 2>DL CC 3>DL CC 4 (herein, a DL CC having a lower cell index has a higher priority). Then, the UE will transmit CSI for the DL CC 2 in a corresponding subframe. Otherwise, since the BS recognizes that the DL CC 2 is deactivated, it is expected that the UE will transmit CSI for the DL CC 3. In this case, if PUSCH transmission exists in the corresponding subframe, the UE piggybacks the CSI for the DL CC 2 through the PUSCH, but the BS recognizes that CSI for the DL CC 3 is piggybacked through the PUSCH. The BS cannot properly perform PUSCH data decoding if an amount of PUSCH resources occupied by the CSI for the DL CC 2 (i.e., an amount of PUSCH resources to be punctured or rate-matched) differs from an amount of PUSCH resources occupied by the CSI for the DL CC 3.

To solve this problem, if CSI is transmitted through a PUSCH in a piggyback manner by selecting one DL CC from a plurality of DL CCs, the amount of PUSCH resources occupied by the CSI is adjusted with respect to CSI for a DL CC occupying a greatest PUSCH resource amount irrespective of an deactivation/activation state among the plurality of DL CCs. The selected DL CC can be selected from activated DL CCs except for deactivated DL CCs from the plurality of DL CCs.

Figure 12:
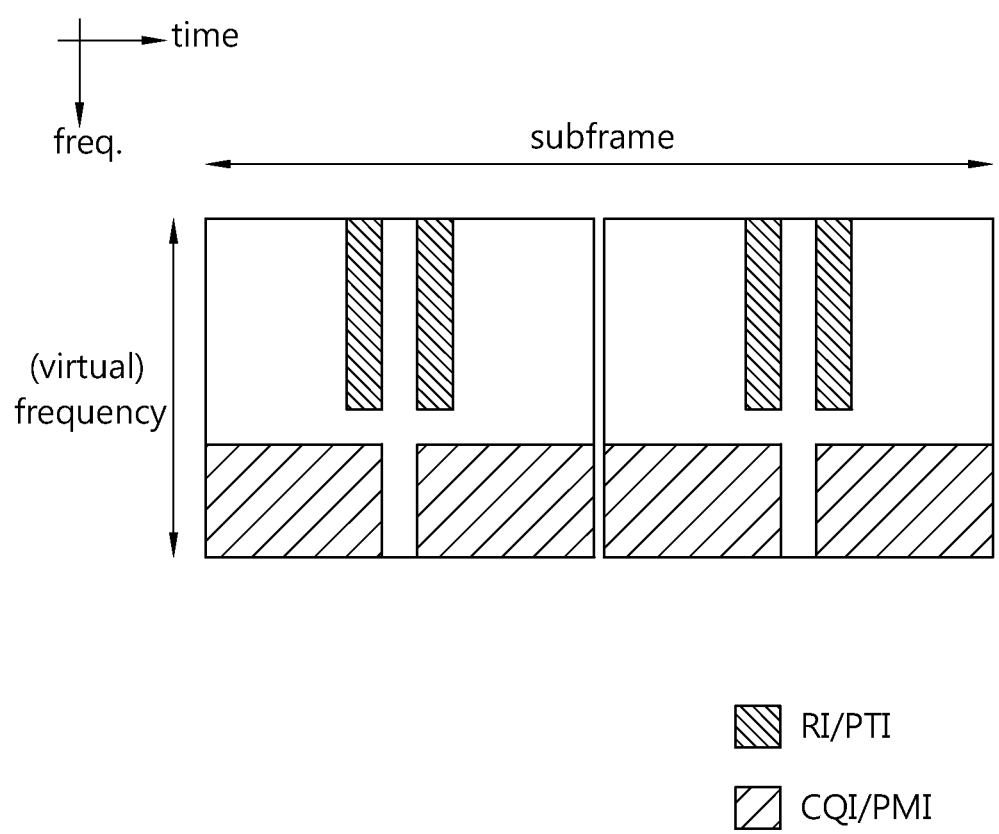
FIG. 12 to FIG. 14 are diagrams showing an embodiment 2 of the present invention.
Figure 13:
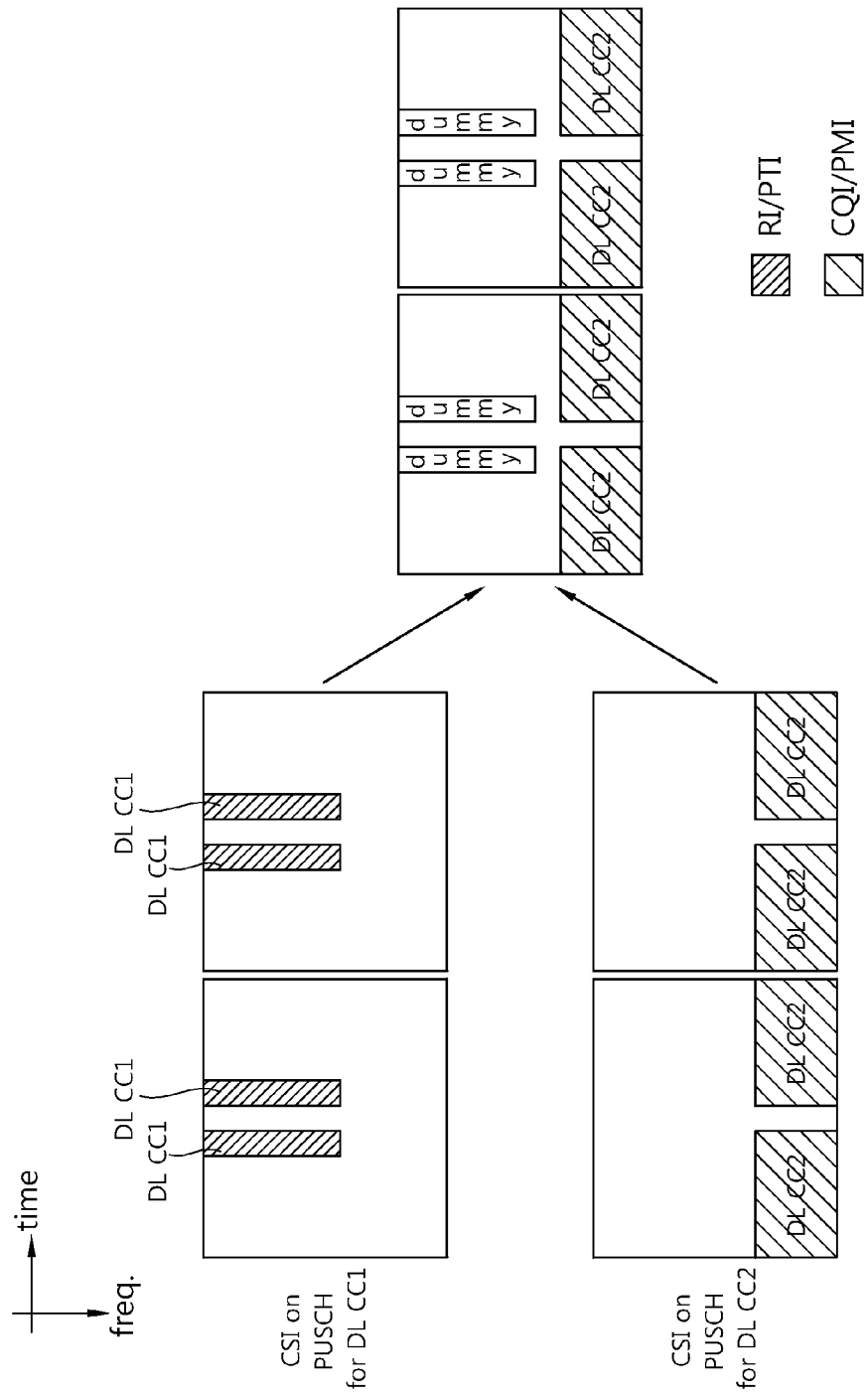
Figure 14:
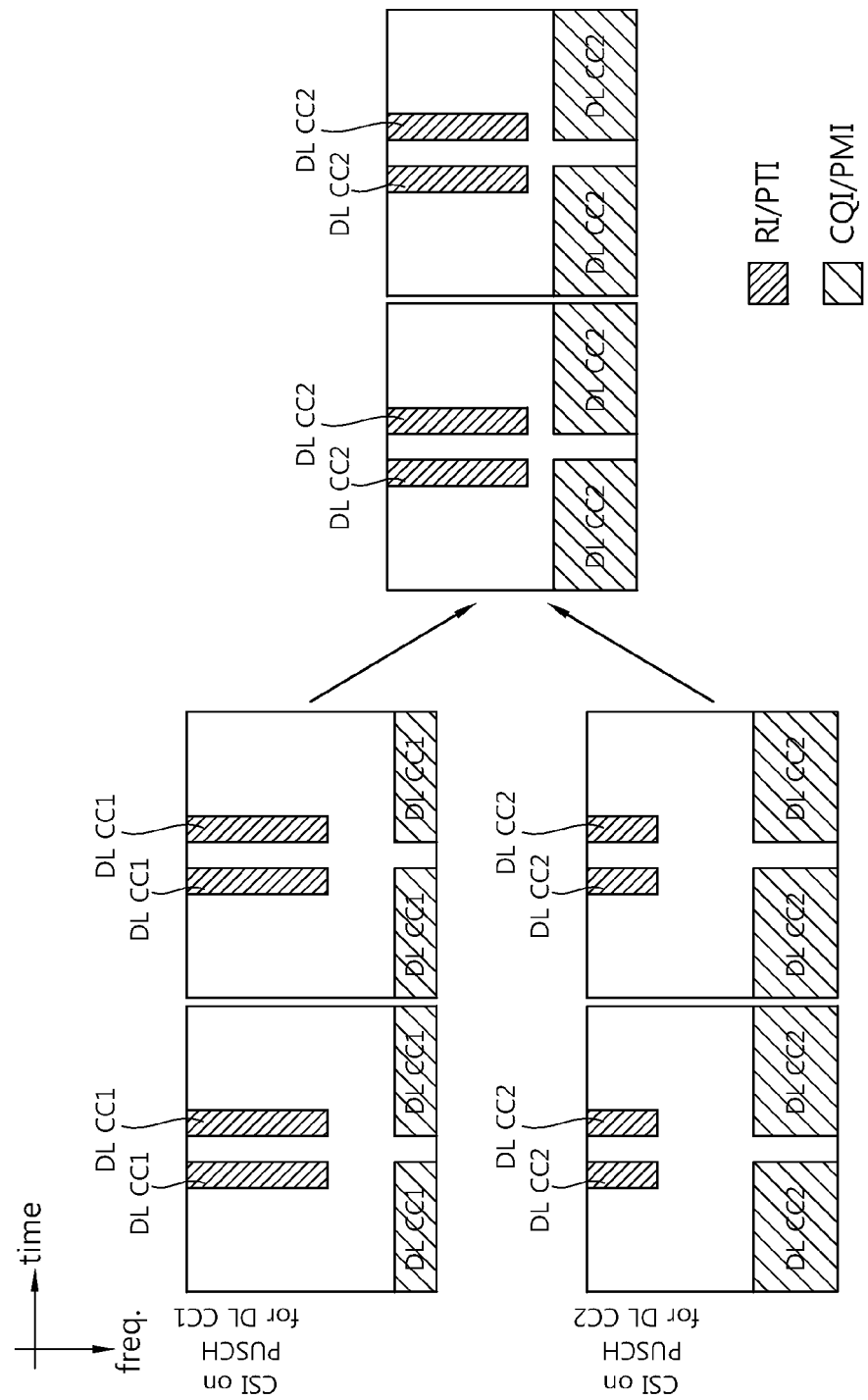

FIG. 12 to FIG. 14 are diagrams showing an embodiment 2 of the present invention.

FIG. 12 shows an example of a conventional case where a PUSCH resource is occupied when CSI is piggybacked.

Referring to FIG. 12, the CSI such as CQI/PMI, RUPTI, etc., is multiplexed on a PUSCH region in a subframe. In this case, a frequency/time/spatial resource to be piggybacked on a PUSCH may be located differently according to a type of the CSI.

FIG. 13 shows an example of a case where a PUSCH resource is occupied when CSI is piggybacked according to an embodiment 2.

Referring to FIG. 13, it is assumed that a DL CC 1 and a DL CC 2 are assigned to a UE, and only the DL CC 2 is activated. A specific subframe can be configured such that RI/PTI is transmitted for the DL CC 1 and CQI/PMI is transmitted for the DL CC 2. In this case, the UE can transmit discontinuous transmission (DTX) or any predetermined dummy information (or RI/PTI for the DL CC 1) in an RI/PTI region for the DL CC 1, and can transmit CQI/PMI for the DL CC 2 in a CQI/PMI region for the DL CC 2. Even though the DL CC 1 is deactivated, a dummy signal is transmitted in a PUSCH resource for transmitting the CSI for the DL CC 1 due to a possibility of misrecognition.

That is, if a resource occupied by the entirety or part of CSI to be transmitted for each DL CC is located differently in a subframe configured to transmit CSI for a plurality of DL CCs, the UE transmits CSI for a selected DL CC by using a PUSCH region corresponding to a union of PUSCH resources to be occupied by the CSI for the plurality of DL CCs. In this case, dummy data or CSI for an unselected DL CC is transmitted in a part of the PUSCH region corresponding to the union.

FIG. 14 shows another example of a case where a PUSCH resource is occupied when CSI is piggybacked according to an embodiment 2.

Referring to FIG. 14, it is assumed that a DL CC 1 and a DL CC 2 are assigned to a UE, and only the DL CC 2 is activated. A specific subframe can be configured such that RI/PTI and CQI/PMI are transmitted respectively for the DL CC 1 and the DL CC 2. In this case, the UE transmits CSI for a selected DL CC by using a PUSCH resource of a DL CC occupying more PUSCH resources (for CSI transmission) between two DL CCs in the specific subframe.

Referring to FIG. 14, a PUSCH resource for RI/PTI information transmission is assigned in a greater amount to a DL CC 1, and a PUSCH resource for CQI/PMI information transmission is assigned in a greater amount to a DL CC 2. If a UE selects the DL CC 2 in a situation where a specific subframe is configured to transmit RI/PTI and CQI/PMI for the DL CC 1 and the DL CC 2, the UE transmits the RI/PTI for the DL CC 2 by using the same PUSCH resource as that used in a case where the RI/PTI for the DL CC 1 is transmitted. In addition, CQI/PMI for the DL CC 2 is transmitted by using a PUSCH resource configured for the DL CC 2.

That is, if there are CSI types (or other control signaling types) occupying different PUSCH resource regions in a subframe configured to transmit CSI for a plurality of assigned DL CCs, an amount of PUSCH resources occupied when it is piggybacked through a PUSCH is compared for each CSI type, and corresponding CSI for an activated DL CC is transmitted according to a greatest PUSCH resource amount. If there is a CSI type configured to be transmitted only for a deactivated DL CC, then DTX or any predetermined dummy information can be transmitted in a corresponding PUSCH resource region.

For example, assume that four DL CCs (e.g., a DL CC 1, a DL CC 2, a DL CC 3, and a DL CC 4) are allocated to the UE. In this case, it is assumed that a BS reports to the UE that the DL CC 1 and the DL CC 2 are deactivated and the DL CC 3 and the DL CC 4 are activated. Herein, it is assumed that an error occurs and thus the UE incorrectly recognizes that the DL CC 1 to the DL CC 4 are all activated. In this case, periodic CSI transmission may be configured for the DL CC 2, the DL CC 3, and the DL CC 4 in any subframe, and a priority of transmitting the periodic CSI may be determined to DL CC 1>DL CC 2>DL CC 3>DL CC 4 (herein, a DL CC having a lower cell index has a higher priority).

When the aforementioned method of FIG. 14 is applied in this case, an amount of PUSCH resources occupied by CSI is adjusted to a greatest amount, that is, a maximum PUSCH resource amount, among the DL CC 2 to the DL CC 4, and this is known to both the BS and the UE. Therefore, although there is an error in that the UE transmits CSI for the DL CC 2 by multiplexing it on the PUSCH while the BS expects that CSI for the DL CC 3 will be transmitted by being multiplexed on the PUSCH, the BS can correctly decode PUSCH data by decoding the PUSCH data in the remaining resources except for the maximum amount of PUSCH resources occupied by CSI in the PUSCH.

By using the method of determining a maximum PUSCH resource amount for CSI piggyback in the embodiment 2, a maximum PUSCH resource amount among PUSCH resource amounts respectively occupied by CSI for a plurality of DL CCs can be determined as an amount of PUSCH resources occupied by CSI information having a greatest payload amount with respect to a payload amount of CSI information.

For example, an amount of PUSCH resources occupied when specific CSI information is transmitted in a piggyback manner through a PUSCH can be determined by using parameters which are combinations of all or some of a frequency/time/spatial resource amount used for payload transmission of corresponding CSI information, an amount of data transmitted through the PUSCH, and a weight value assigned to a higher layer RRC parameter. A PUSCH resource amount calculated by using the parameter can be assumed such that CSI information having a greatest payload amount among CSI information for a plurality of DL CCs occupies a maximum amount of PUSCH resources, if it is assumed that the greater the payload amount of the CSI information, the greater the amount of PUSCH resources used to transmit the CSI information.

The embodiment 2 can be modified such that, for example, an amount of PUSCH resources occupied when CSI is piggybacked in a corresponding subframe can be determined to an amount of PUSCH resources occupied under the assumption that a specific CSI payload size is fixed irrespective of a specific type of CSI transmitted for a specific DL CC in practice. In this case, the specific CSI payload size may be a maximum CSI payload size (e.g., 11 bits) that can be transmitted through a PUCCH. The specific CSI payload size can be determined differently for each CSI type. That is, the CSI payload size can be fixed for each group of CSI information types for each of RI/PTI/PMI/CQI which are CSI information types that can be transmitted through the PUCCH, and the CSI can be transmitted by using a PUSCH resource amount calculated to a fixed CSI payload size for each CSI type irrespective of a selected DL CC.

Alternatively, the CSI payload size can be configured using RRC or can be determined using a function of parameters delivered using RRC. In this case, the CSI payload size can be configured differently for each CSI type.

3. <Embodiment 3>

The embodiment 3 relates to a method of operating a UE when a DL CC for which CSI is fed back is a deactivated DL CC in a subframe.

As a CSI value for the deactivated DL CC, the UE may transmit a value defined as an "out of range" value among CSI values used in CSI reporting or a value indicating a worst channel status.

For example, a CQI value used in CSI reporting in an activated DL CC is defined in Table 1 below.

TABLE 1

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

In Table 1 above, the CQI index '0' implies that a channel status is bad to such a level that there is no CSI that can be properly received through a corresponding DL CC at a corresponding time. Such a CQI index is used as CSI for a deactivated DL CC.

According to this method, there is no need to measure CSI for a deactivated DL CC since the UE reports a CSI index defined as an "out of range" value. Therefore, waste of power consumed for DL measurement can be avoided. In addition, even if a DL CC is recognized as an activated DL CC from the perspective of the BS, the UE reports it as an "out of range" value, and thus a priority of scheduling for the DL CC is decreased or scheduling itself is not performed by the BS. Accordingly, an erroneous operation can be reduced even if an activation/deactivation state for a specific DL CC is incorrectly recognized between the BS and the UE.

Alternatively, according to a definition of the CSI value, it is also possible to transmit a lowest CSI value, that is, a CQI index 1 in the above table, instead of the "out of range" value. The CSI index may be an index indicating a worst channel status.

Although periodic CSI is primarily exemplified as CSI in the embodiments 1 to 3 mentioned above, the present invention is not limited thereto. The CSI includes aperiodic CSI or also includes CSI originally configured to be transmitted not through a PUCCH but through a PUSCH. In addition, the aforementioned embodiments are also applicable not only to a case where CSI for a single DL CC is transmitted through a PUSCH but also a case where CSI for a plurality of DL CCs is transmitted through a PUSCH.

Figure 15:
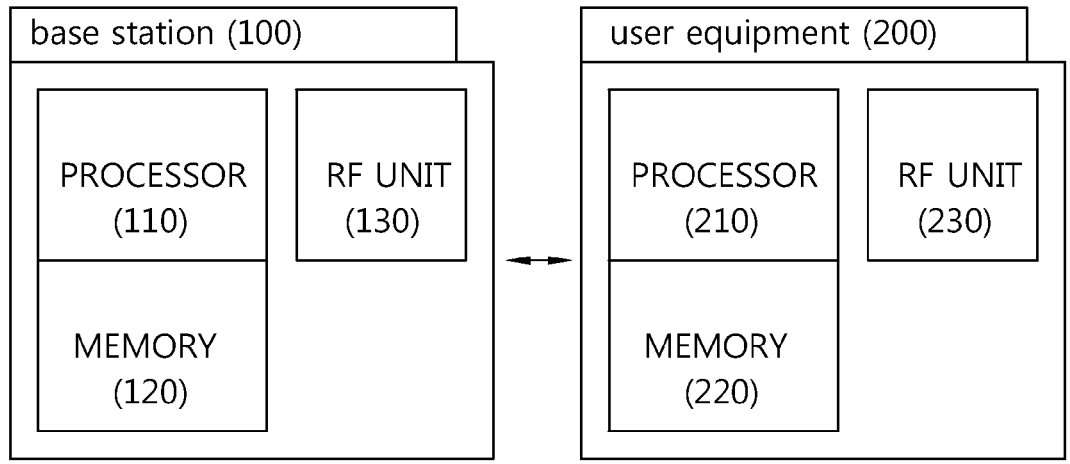
FIG. 15 is a block diagram of a BS and a UE according to an embodiment of the present invention.

FIG. 15 is a block diagram of a BS and a UE according to an embodiment of the present invention.

A BS 100 includes a processor 110, a memory 120, and a radio frequency (RF) unit 130. The processor 110 implements the proposed functions, procedures, and/or methods. Layers of a radio interface protocol can be implemented by the processor 110. The processor 110 may allocate a plurality of serving cells to the UE, and may indicate a serving cell for transmitting channel status information (CSI) in a subframe. In addition, the processor 110 decodes multiplexed uplink data together with the CSI. The memory 120 coupled to the processor 110 stores a variety of information for driving the processor 110. The RF unit 130 coupled to the processor 110 transmits and/or receives a radio signal.

A UE 200 includes a processor 210, a memory 220, and an RF unit 230. The processor 210 implements the proposed functions, procedures, and/or methods. Layers of a radio interface protocol can be implemented by the processor 210. The processor 210 allocates a plurality of serving cells, and configures a subframe predetermined to transmit CSI for a single serving cell among the allocated plurality of serving cells. If uplink data transmission via a physical uplink shared channel (PUSCH) region exists in the configured subframe and if the serving cell for which the channel status information is generated is deactivated, the processor 210 piggybacks deactivation confirmation information for indicating that the serving cell is deactivated via the PUSCH region.

Alternatively, the processor 210 allocates a plurality of serving cells, configures a subframe predetermined to transmit CSI for N serving cells (where N is a natural number greater than or equal to 2) among the allocated plurality of serving cells. Further, the processor 210 selects a single activated serving cell to which the CSI is fed back among the N serving cells. If uplink data transmission via a PUSCH region exists in the configured subframe, the CSI for the single activated serving cell is transmitted using a PUSCH resource corresponding to a union of PUSCH resources for transmitting CSI for each of the N serving cells.

Alternatively, the processor 210 allocates a plurality of serving cells, and configures a subframe predetermined to transmit CSI for a single serving cell among the allocated plurality of serving cells. Further, the processor 210 selects one serving cell for which the CSI is fed back among the at least one serving cell. If the selected one serving cell is a deactivated cell, the processor 210 transmits a specific value among CSI that can be transmitted when the selected one serving cell is activated.

The memory 220 coupled to the processor 210 stores a variety of information for driving the processor 210. The RF unit 230 coupled to the processor 210 transmits and/or receives a radio signal.

The processors 110 and 210 may include an application-specific integrated circuit (ASIC), a separate chipset, a logic circuit, and/or a data processing unit. The memories 120 and 220 may include a read-only memory (ROM), a random access memory (RAM), a flash memory, a memory card, a storage medium, and/or other equivalent storage devices. The RF units 130 and 230 may include a base-band circuit for processing a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means. Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The aforementioned embodiments include various exemplary aspects. Although all possible combinations for representing the various aspects cannot be described, it will be understood by those skilled in the art that other combinations are also possible. Therefore, all replacements, modifications and changes should fall within the spirit and scope of the claims of the present invention.

The invention claimed is:

1. A channel status information (CSI) transmission method performed by a user equipment in a carrier aggregation system, comprising:
   obtaining information of a single serving cell among a plurality of serving cells,
   wherein the information of the single serving cell indicates whether the single serving cell is in a deactivated state or in an activated state,
   receiving subframe allocation information for transmitting CSI of the single serving cell among the plurality of serving cells,
   wherein the subframe allocation information indicates a configuration of a subframe that is used to transmit the CSI of the single serving cell; and
   when if uplink data transmission via a physical uplink shared channel (PUSCH) region exists in the configuration of the subframe, and
   when the single serving cell is in the deactivated state, transmitting deactivation confirmation information for indicating that the single serving cell is deactivated via the PUSCH region together with the uplink data,
   wherein the CSI is multiplexed by puncturing a PUSCH resource according to a type of the CSI or by decreasing an amount of coded bits for the PUSCH through a rate-matching, and
   wherein the single serving cell includes a single downlink component carrier, and the deactivation confirmation information is information for indicating that the single downlink component carrier is deactivated.

2. The method of claim 1, wherein the deactivation configuration information is transmitted by using the resource as that used for CSI transmitted when the single serving cell is activated in the PUSCH region.

3. The method of claim 2, wherein the deactivation confirmation information is transmitted by puncturing the resource or by performing the rate-matching as that used for the CSI transmitted when the single serving cell is activated.

4. The method of claim 1, wherein the CSI for the single serving cell is periodic CSI.

5. A channel status information (CSI) transmission method performed by a user equipment in a carrier aggregation system, comprising:
   obtaining information of a single serving cell among a plurality of serving cells,
   wherein the information of the single serving cell indicates whether the single serving cell is in a deactivated state or in an activated state;

receiving subframe allocation information for transmitting CSI for N serving cells (where N is a natural number greater than or equal to 2) among the plurality of serving cells, wherein the subframe allocation information indicates a configuration of a subframe that is used to transmit the CSI of the single serving cell; and selecting a single activated serving cell to which the CSI is fed back among the N serving cells, wherein, when uplink data transmission via a physical uplink shared channel (PUSCH) region exists in the configuration of the subframe, the CSI for the single activated serving cell is transmitted using a PUSCH resource corresponding to a union of PUSCH resources for transmitting CSI for each of the N serving cells, wherein the CSI is multiplexed by puncturing the PUSCH resource according to a type of the CSI or by decreasing an amount of coded bits for the PUSCH through a rate-matching, and wherein the single serving cell includes a single downlink component carrier, and the deactivation confirmation information is information for indicating that the single downlink component carrier is deactivated.

6. The method of claim 5, wherein the N serving cells include a deactivated serving cell.

7. The method of claim 5, wherein the CSI for the activated single serving cell is transmitted together with the uplink data.

8. The method of claim 7, wherein the CSI for the activated single serving cell is transmitted in some of the PUSCH resources corresponding to the union, and dummy data is transmitted in the remaining PUSCH resources.

9. A channel status information (CSI) CSI transmission method performed by a user equipment in a carrier aggregation system, comprising:

obtaining information of a single serving cell among a plurality of serving cells, wherein the information of the single serving cell indicates whether the single serving cell is in a deactivated state or in an activated state;

receiving subframe allocation information for transmitting CSI of the single serving cell among the plurality of serving cells, wherein the subframe allocation information indicates a configuration of a subframe that is used to transmit the CSI of the single serving cell; and selecting one serving cell for which the CSI is fed back among the at least one serving cell, wherein, when the selected one serving cell is a deactivated serving cell, a specific value is transmitted among CSI that can be transmitted when the selected one serving cell is activated, and wherein the CSI is multiplexed by puncturing a physical uplink shared channel (PUSCH) resource according to a type of the CSI or by decreasing an amount of coded bits for a physical uplink shared channel (PUSCH) through a rate-matching.

10. The method of claim 9, wherein the specific value is a value indicating a worst channel status.

11. A user equipment comprising:

a radio frequency (RF) unit for transmitting and receiving a radio signal; and a processor coupled to the RF unit, wherein the processor obtains information of a single serving cell among a plurality of serving cells, wherein the information of the single serving cell indicates whether the single serving cell is in a deactivated state or in an activated state;

receives subframe allocation information for transmitting CSI of the single serving cell among the allocated plurality of serving cells, wherein the subframe allocation information indicates a configuration of a subframe that is used to transmit the CSI of the single serving cell; and when uplink data transmission via a PUSCH region exists in the configuration of the subframe and when the single serving cell is in the deactivated state, transmits deactivation confirmation information for indicating that the single serving cell is deactivated via the PUSCH region together with the uplink data, wherein the CSI is multiplexed by puncturing a PUSCH resource according to a type of the CSI or by decreasing an amount of coded bits for the PUSCH through a rate-matching, and wherein the single serving cell includes a single downlink component carrier, and the deactivation confirmation information is information for indicating that the single downlink component carrier is deactivated.

12. A user equipment comprising:

an RF unit for transmitting and receiving a radio signal; and a processor coupled to the RF unit and configured to:

obtain information of a single serving cell among a plurality of serving cells, wherein the information of the single serving cell indicates whether the single serving cell is in a deactivated state or in an activated state;

receive subframe allocation information for transmitting channel status information (CSI) for N serving cells (where N is a natural number greater than or equal to 2) among the allocated plurality of serving cells, wherein the subframe allocation information indicates a configuration of a subframe that is used to transmit the CSI of the single serving cell; and select a single activated serving cell to which the CSI is fed back among the N serving cells, wherein, when uplink data transmission via a physical uplink shared channel (PUSCH) region exists in the configuration of the subframe, the CSI for the single activated serving cell is transmitted using a PUSCH resource corresponding to a union of PUSCH resources for transmitting CSI for each of the N serving cells, wherein the CSI is multiplexed by puncturing the PUSCH resource according to a type of the CSI or by decreasing an amount of coded bits for the PUSCH through a rate-matching, and wherein the single serving cell includes a single downlink component carrier, and the deactivation confirmation information is information for indicating that the single downlink component carrier is deactivated.

13. A user equipment comprising:

an RF unit for transmitting and receiving a radio signal; and a processor coupled to the RF unit and configured to:

obtain information of a single serving cell among a plurality of serving cells, wherein the information of the single serving cell indicates whether the single serving cell is in a deactivated state or in an activated state;

receive subframe allocation information for transmitting channel status information (CSI) for a single serving cell among the plurality of serving cells, wherein the subframe allocation information indicates a configuration of a subframe that is used to transmit the CSI of the single serving cell; and select one serving cell for which the CSI is fed back among the at least one serving cell, wherein, when the selected one serving cell is a deactivated cell, a specific value is transmitted among CSI that can be transmitted when the selected one serving cell is activated, and wherein the CSI is multiplexed by puncturing a physical uplink shared channel (PUSCH) resource according to a type of the CSI or by decreasing an amount of coded bits for a physical uplink shared channel (PUSCH) through a rate-matching.

* * * * *